United States Patent
Bai et al.

(10) Patent No.: US 12,066,315 B2
(45) Date of Patent: Aug. 20, 2024

(54) METHOD FOR PREDICTING THE MASS OF HEAVY VEHICLES BASED ON NETWORKED OPERATING DATA AND MACHINE LEARNING

(71) Applicants: CATARC AUTOMOTIVE TEST CENTER (TIANJIN) CO., LTD, Tianjin (CN); CHINA AUTOMOTIVE TECHNOLOGY AND RESEARCH CENTER CO., LTD, Tianjin (CN)

(72) Inventors: Xiaoxin Bai, Tianjin (CN); Chunling Wu, Tianjin (CN); Xiaojun Jing, Tianjin (CN); Yongzhen Yang, Tianjin (CN); Changyu Li, Tianjin (CN); Xu Li, Tianjin (CN); Weilin Liu, Tianjin (CN); Ziming Jing, Tianjin (CN); Jinghui Fan, Tianjin (CN); Na Li, Tianjin (CN); Jing Wang, Tianjin (CN); Wenjin Zhou, Tianjin (CN)

(73) Assignees: CATARC AUTOMOTIVE TEST CENTER (TIANJIN) CO., LTD, Tianjin (CN); CHINA AUTOMOTIVE TECHNOLOGY AND RESEARCH CENTER CO., LTD, Tianjin (CN)

( * ) Notice: Subject to any disclaimer, the term of this patent is extended or adjusted under 35 U.S.C. 154(b) by 0 days.

(21) Appl. No.: 18/475,248

(22) Filed: Sep. 27, 2023

(65) Prior Publication Data
US 2024/0230397 A1    Jul. 11, 2024

(30) Foreign Application Priority Data
Jan. 5, 2023    (CN) .......................... 202310009644.6

(51) Int. Cl.
B60W 40/13    (2012.01)
B60W 50/00    (2006.01)
(Continued)

(52) U.S. Cl.
CPC ............ *G01G 19/086* (2013.01); *G06N 20/00* (2019.01); *G07C 5/008* (2013.01); *B60W 40/00* (2013.01);
(Continued)

(58) Field of Classification Search
CPC .. B60W 40/00; B60W 40/076; B60W 40/105; B60W 40/107; B60W 40/13;
(Continued)

(56) References Cited

U.S. PATENT DOCUMENTS 8,315,758 B2 * 11/2012 Takenaka ................ B60T 8/172
                                                    701/72
9,349,150 B2 *  5/2016 Chidlovskii ........... G06Q 10/04
(Continued)

FOREIGN PATENT DOCUMENTS

CN    111831960 A    10/2020
CN    114932913 A     8/2022
(Continued)

OTHER PUBLICATIONS

Al Alam, Assad, Ather Gattami, and Karl Henrik Johansson. "An experimental study on the fuel reduction potential of heavy duty vehicle platooning." 13th international IEEE conference on intelligent transportation systems. IEEE,. (Year: 2010).*
(Continued)

*Primary Examiner* — Cuong H Nguyen
(74) *Attorney, Agent, or Firm* — True Shepherd LLC; Andrew C. Cheng

(57) ABSTRACT

A method for predicting mass of heavy vehicles based on networked operating data and machine learning includes: collecting operating data; extracting speed, engine output torque, satellite elevation, and gear position under a driving condition; determining a transmission ratio of the heavy vehicle based on the gear position; filtering the speed, engine
(Continued)

output torque, and the satellite elevation using three of the plurality of filtering parameters; determining a filtered vehicle longitudinal acceleration under the driving condition using the filtered speed, and one of the plurality of filtering parameters; determining a filtered road gradient sine value under the driving condition using the filtered speed, satellite elevation, and one of the plurality of filtering parameters; and inputting the speed, engine output torque, vehicle longitudinal acceleration, road gradient sine value, and transmission ratio into a vehicle mass prediction model to obtain a predicted mass.

8 Claims, 2 Drawing Sheets

(51) Int. Cl.
  *G01G 19/08* (2006.01)
  *G06N 20/00* (2019.01)
  *G07C 5/00* (2006.01)
  *B60W 40/00* (2006.01)
  *B60W 40/076* (2012.01)
  *B60W 40/105* (2012.01)
  *B60W 40/107* (2012.01)

(52) U.S. Cl.
  CPC ......... *B60W 40/076* (2013.01); *B60W 40/105* (2013.01); *B60W 40/107* (2013.01); *B60W 40/13* (2013.01)

(58) Field of Classification Search
  CPC ........ B60W 50/00; B60W 10/06; G05D 1/02; B60R 16/023

USPC ..................................................... 701/53, 59
  See application file for complete search history.

(56) References Cited

U.S. PATENT DOCUMENTS

| | | | |
|---|---|---|---|
| 10,814,881 B2 * | 10/2020 | Liu | H04W 4/48 |
| 11,125,175 B2 | 9/2021 | Chen et al. | |
| 11,287,439 B2 * | 3/2022 | Oh | G01P 3/481 |
| 11,635,764 B2 | 4/2023 | Chidlovskii et al. | |
| 2007/0005212 A1 * | 1/2007 | Xu | B60W 30/045 |
| | | | 701/45 |
| 2011/0077798 A1 * | 3/2011 | Nishizawa | B60W 40/06 |
| | | | 701/1 |
| 2020/0088756 A1 * | 3/2020 | Oh | B60W 40/105 |

FOREIGN PATENT DOCUMENTS

| | | | | |
|---|---|---|---|---|
| CN | 1152044417 B | * | 12/2022 | ............ G06N 20/20 |
| KR | 20220008436 A | * | 1/2022 | .......... B60W 40/105 |

OTHER PUBLICATIONS

Villaescusa, E., et al. An abstract of "Dynamic testing of ground control systems." Results of research carried out as MERIWA Project M349A. (Year: 2010).*

Holm, Erik Jonsson. "Vehicle mass and road grade estimation using Kalman filter." Inst. Syst. Dep. Electr. Eng 16 : 1-38. (Year: 2011).*

An_abstract_for_Methods_in_Vehicle_Mass_and_Road_Grade_Estimation (Year: 2014).*

* cited by examiner

METHOD FOR PREDICTING THE MASS OF HEAVY VEHICLES BASED ON NETWORKED OPERATING DATA AND MACHINE LEARNING

CROSS-REFERENCE TO RELATED APPLICATIONS

The present application claims priority to Chinese Patent Application No. 202310009644.6 with a filing date of Jan. 5, 2023. The content of the aforementioned application, including any intervening amendments thereto, is incorporated herein by reference.

TECHNICAL FIELD

The present disclosure relates to the filed of heavy vehicle overload management, particularly to a method for predicting the mass of heavy vehicles based on networked operating data and machine learning.

BACKGROUND OF THE INVENTION

Overloading of heavy trucks is a significant cause of damage to road infrastructure, frequent traffic accidents, and disruptions in the transportation market. According to survey data, approximately 50% of severe and fatal road traffic accidents in the country are related to overloading. If a vehicle is overloaded by 50%, the normal service life of the road will be reduced by 80%. This demonstrates the enormous threat that overloading of heavy vehicles poses to the road transport industry and people's lives and property. Accurately identifying overloaded heavy vehicles and strengthening source control have become key measures in managing overloading. In recent years, the application of static weighing systems such as "weigh-in-motion" at highway entrances has contributed to some extent in curbing overloading. However, the use of static weighing technology, primarily through weighbridge inspections, has drawbacks such as high equipment installation and maintenance costs, extensive deployment efforts, low testing efficiency, and limited coverage of the road networked. It is unable to provide real-time measurement of the load of in-use vehicles, making it challenging to enforce overload regulations for a large number of vehicles in operation.

Therefore, real-time assessment of heavy vehicle mass based on operational data has emerged as a solution. Existing techniques for estimating heavy vehicle mass are mostly based on the longitudinal dynamics of the entire vehicle and rely on the installation of additional accelerometer sensors to accurately capture the vehicle's three-axis acceleration state parameters. However, the effectiveness of prediction is often limited by the type and precision of the sensors, and it significantly increases the cost of the vehicle, making widespread adoption challenging. On the basis of existing heavy vehicle configurations, accurately obtaining real-time vehicle mass is particularly crucial for managing overloading in a large-scale fleet of in-use heavy vehicles.

SUMMARY OF THE INVENTION

To address at least one of the aforementioned technical challenges, the present disclosure provides a method for predicting mass of heavy vehicles based on networked operating data and machine learning.

According to one aspect of the present disclosure, embodiments of the present disclosure provides a method for predicting mass of heavy vehicles based on networked operating data and machine learning. The method includes:

collecting operating data of a heavy vehicle within a preset period through the vehicle-mounted data terminal; the operating data comprises speed, engine output torque, satellite elevation, gear position, brake signal, and clutch signal of the heavy vehicle;

extracting the speed, engine output torque, satellite elevation, and gear position under a driving condition from the operating data according to the braking signal and the clutch signal;

determining a transmission ratio of the heavy vehicle according to the gear position under the driving condition;

obtaining a plurality of filter parameters generated by executing a machine learning parameter optimization algorithm in advance; filtering the speed, engine output torque, and satellite elevation under the driving condition using three of the plurality of filter parameters; determining a vehicle longitudinal acceleration under the driving condition using the filtered speed and one of the plurality of filter parameters; determining a road gradient sine value under the driving condition using the filtered speed, the filtered satellite elevation, and one of the plurality of filter parameters;

inputting the filtered speed, the filtered speed, the vehicle longitudinal acceleration, the road gradient sine value, and the transmission ratio into a vehicle mass prediction model to obtain a predicted mass of the heavy vehicle.

The embodiments of the present disclosure achieves the following advantages. Firstly, the operating data of the heavy vehicle is collected through a vehicle-mounted data terminal. Then the speed, engine output torque, satellite elevation, and gear position under the driving condition are extracted from the operating data. The transmission ratio of the heavy vehicle is then determined based on the gear position under the driving condition. Next, a plurality of filtering parameters generated by a machine learning parameter optimization algorithm are obtained. Then the speed, engine output torque, and satellite elevation under the driving condition are filtered using three of the plurality of filtering parameters. The filtered speed, along with one of the plurality of filtering parameters, is used to determine the vehicle longitudinal acceleration under the driving condition. The filtered speed, satellite elevation, and one of the plurality of filtering parameters are used to determine the road gradient sine value under the driving condition. This provides the filtered speed, engine output torque, longitudinal acceleration, and road gradient sine value under the driving condition. At last, the filtered speed, engine output torque, longitudinal acceleration, road gradient sine value, and transmission ratio are inputted into the vehicle mass prediction model to obtain the predicted mass for the heavy vehicle. Under the existing conditions of heavy vehicle configurations, this method enables the accurate measurement of real-time vehicle mass, addressing the issues of high cost and low accuracy in conventional heavy vehicle mass prediction techniques.

BRIEF DESCRIPTION OF THE DRAWINGS

In order to illustrate the specific embodiments of the present disclosure or the technical solutions in the prior art more clearly, the following briefly introduces the accompanying drawings that need to be used in the description of the specific embodiments or the prior art. Obviously, the accompanying drawings in the following description are some embodiments of the present disclosure. For those of ordinary skill in the art, other drawings can also be obtained based on these drawings without creative efforts.

DETAILED DESCRIPTION OF PREFERRED EMBODIMENTS

In order to make the objectives, technical solutions and advantages of the present disclosure clearer, the technical solutions of the present disclosure will be described clearly and completely below. Obviously, the described embodiments are only some, but not all, embodiments of the present disclosure. Based on the embodiments of the present disclosure, all other embodiments obtained by those of ordinary skill in the art without creative work fall within the protection scope of the present disclosure.

Figure 1:
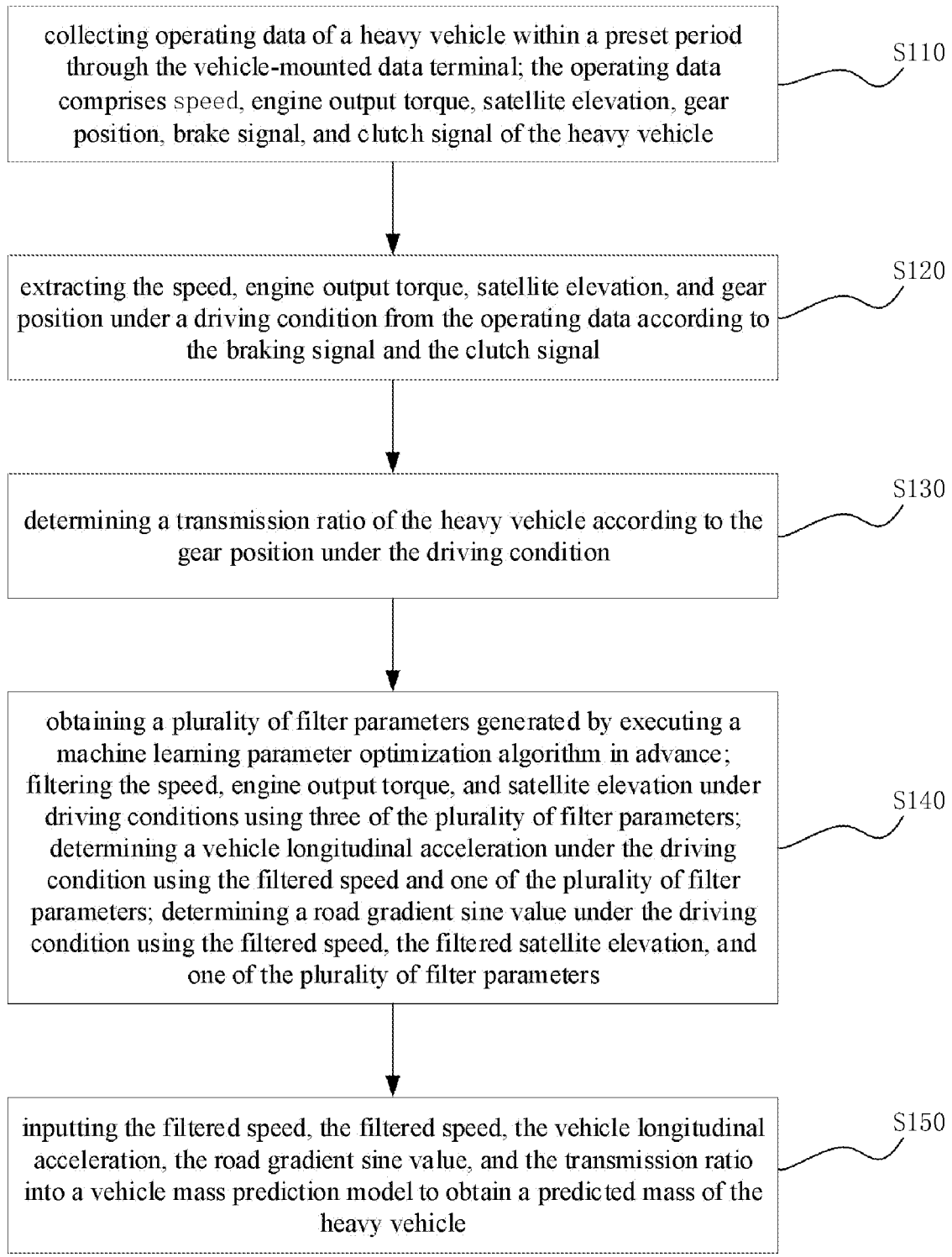
FIG. 1 is a flow diagram showing a method for predicting mass of heavy vehicles based on networked operating data and machine learning according to one embodiment of the present disclosure.

In one aspect, embodiments of the present disclosure provides a method for predicting mass of heavy vehicles based on networked operating data and machine learning. Referring to FIG. 1, the method includes the followings steps S110-S150.

S110, collecting operating data of a heavy vehicle within a preset period through the vehicle-mounted data terminal; the operating data comprises speed, engine output torque, satellite elevation, gear position, brake signal, and clutch signal of the heavy vehicle.

It is understood that the operating data is collected from a specific period, and each type of operating data is obtained as a sequence arranged in chronological order. For example, sequences such as speed, engine output torque, satellite elevation, gear position, brake signal, and clutch signal. The specific sampling frequency can be set at 1 Hz.

S120, extracting the speed, engine output torque, satellite elevation, and gear position under a driving condition from the operating data according to the braking signal and the clutch signal.

When both the brake signal and clutch signal are "1," it indicates that the brake pedal and clutch pedal are depressed, signifying that the vehicle is in a non-driving condition. On the other hand, when both the brake signal and clutch signal are "0," it means that the brake pedal and clutch pedal are not depressed, indicating that the vehicle is in a driving condition.

In one embodiment, specifically in S120, it can be implemented to filter out the speed, engine output torque, satellite elevation, and gear position corresponding to the condition where both the brake signal and clutch signal are 0. Therefore, the speed, engine output torque, satellite elevation, and gear position corresponding to the condition where both the brake signal and clutch signal are 0 can be considered as the speed, engine output torque, satellite elevation, and gear position under the driving condition.

S130, determining a transmission ratio of the heavy vehicle according to the gear position under the driving condition.

It is understood that gear positions with lower transmission ratios are referred to as high gears, while those with higher transmission ratios are called low gears. Gears with a transmission ratio less than 1 are known as overdrive gears, those with a ratio of 1 are called direct gears, and those with a ratio greater than 1 are known as reduction gears. High gears are commonly used on smooth roads, while low gears are preferred for rough terrain or climbing slopes. Driving in overdrive gears can enhance fuel efficiency. By selecting different gear positions, the engagement between various gears on different axes can be adjusted, thereby altering the output shaft's speed and torque. Lower gears provide stronger deceleration and increased torque.

S140, obtaining a plurality of filter parameters generated by executing a machine learning parameter optimization algorithm in advance; filtering the speed, engine output torque, and satellite elevation under the driving condition using three of the plurality of filter parameters; determining a vehicle longitudinal acceleration under the driving condition using the filtered speed and one of the plurality of filter parameters; determining a road gradient sine value under the driving condition using the filtered speed, the filtered satellite elevation, and one of the plurality of filter parameters.

Namely, by performing a pre-executed machine learning parameter optimization algorithm, the plurality of filtering parameters are obtained. In S140, these filtering parameters are acquired. The speed, engine output torque, and satellite elevation under the driving condition are individually subjected to filtering processing based on three of the plurality of filtering parameters, resulting in the filtered speed, engine output torque, and satellite elevation under the driving condition. Subsequently, the filtered speed and one of the filtering parameters are used to determine the vehicle longitudinal acceleration under the driving condition. Lastly, the filtered speed, satellite elevation, and one of the plurality of filtering parameters are used to determine the filtered road gradient sine value under the driving condition.

In one embodiment, the filtering the speed, engine output torque, and satellite elevation under the driving condition using three of the plurality of filter parameters may include steps S141-S144 as follows.

S141, filtering the speed under the driving condition using a Butterworth low-pass filter; a normalization parameter of a cutoff frequency parameter of the Butterworth-low-pass filter is w1, and the order of the polynomial is 2.

S142, filtering the engine output torque under the driving condition using the Butterworth-low-pass filter; a normalization parameter of the cutoff frequency of the Butterworth low-pass filter is w2, and the order of the polynomial is 2.

S143, extracting a 75th percentile value Q3 and a 25th percentile value Q1 from a first data sequence corresponding to the satellite elevation under the driving condition; determining a first filtering range as [Q1−1.5(Q3−Q1), Q3+1.5(Q3−Q1)], and removing the satellite elevation that outsides the first filtering range from the first data sequence.

S144, filtering the satellite elevation within the first filtering range under the driving condition using a S-G filter (Savitzky-Golay filter); a window length of the S-G filter is w3, and the order of the polynomial is 3.

The normalization parameter w1, the normalization parameter w2, and the windows length w3 are the three of the plurality of the filter parameters.

S143, in fact, refers to the box plot method. This approach utilizes quartiles and interquartile range as criteria for identifying outliers. Quartiles exhibit a certain level of resistance, allowing up to 25% of the data to deviate significantly without greatly disturbing the quartiles. This characteristic prevents outliers from exerting a substantial influence on the overall shape of the data, resulting in a more objective identification of outliers through the box plot method.

The S-G filter, also known as the Savitzky-Golay filter, is a convolution-based smoothing algorithm based on the least squares method. By using the Butterworth low-pass filter on the speed and engine output torque, high-frequency noise signals can be effectively removed.

Apparently, through the aforementioned steps S141-S144, the filtered speed, engine output torque, and satellite elevation can be obtained.

In one embodiment, determining a vehicle longitudinal acceleration under the driving condition using the filtered speed and one of the plurality of filter parameters in step S140 may include steps S145-S147 as follows:

S145, calculating the vehicle longitudinal acceleration under the driving condition according to the filtered speed.

Specifically, S145 may include: calculating the vehicle longitudinal acceleration under the driving condition by a formula $$a_y = \frac{dv}{dt};$$

where, dv represents a speed difference between adjacent sampling points; dt represents a time difference between adjacent sampling points; ay represents the vehicle longitudinal acceleration.

S146, extracting a 75th percentile value Q3 and a 25th percentile value Q1 from a second data sequence corresponding to the vehicle longitudinal acceleration under the driving condition; determining a second filtering range as [Q1−1.5(Q3−Q1), Q3+1.5(Q3−Q1)] according to the 75th percentile value Q3 and the 25th percentile value Q1, and removing the vehicle longitudinal acceleration that outsides the second filtering range from the second data sequence.

S147, filtering the vehicle longitudinal acceleration within the second filtering range under the driving condition using the S-G filter to obtain a filtered vehicle longitudinal acceleration under the driving condition; a normalization parameter of a cutoff frequency parameter of the Butterworth low-pass filter is w4, and the order of the polynomial is 2; the normalization parameter w4 is the one of the plurality of filter parameters.

Apparently, the filtered vehicle longitudinal acceleration can be obtained through steps S145-S147.

In one embodiment, determining a road gradient sine value under the driving condition using the filtered speed, the filtered satellite elevation, and one of the plurality of filter parameters in step S140 may include steps a1-a4 as follows.

a1, calculating the road gradient sine value under the driving conditions based on the filtered satellite elevation and the filtered speed.

Specifically, a1 may include: calculating the road gradient sine value under the driving condition by a formula $$\sin\alpha = \frac{dh}{0.5 \times dv \times dt},$$

where, sin α is the road gradient sine value; dh represents a satellite elevation difference between adjacent sampling points; dv represents the speed difference between adjacent sampling points; dt represents the time difference between adjacent sampling points.

a2, extracting a 75th percentile value Q3 and a 25th percentile value Q1 from a third data sequence corresponding to the road gradient sine value under the driving condition; determining a third filtering range as [Q1−1.5(Q3−Q1), Q3+1.5(Q3−Q1)] according to the 75th percentile value Q3 and the 25th percentile value Q1, and removing the road gradient sine value that outsides the third filtering range from the third data sequence.

a3, filtering the road gradient sine value within the third filtering range under the driving condition using the Butterworth low-pass filter to obtain a filtered road gradient sine value under the driving condition; a normalization parameter of a cutoff frequency parameter of the Butterworth low-pass filter is w5, and the order of the polynomial is 2; the normalization parameter w5 is the one of the plurality of filter parameters.

a4, removing the road gradient sine values that are greater than 0.08 or less than −0.08.

In step a4, the road gradient sine values that are greater than 0.08 or smaller than −0.08 are removed according to the road design specifications. This is done to ensure that the remaining road gradient sine values conform to the road design specifications.

Apparently, the filtered road gradient sine value can be obtained through steps a1-a4.

Thus, the filtered speed, engine output torque, vehicle longitudinal acceleration, and road gradient sine value under the driving condition are all obtained.

S150, inputting the filtered speed, the filtered speed, the vehicle longitudinal acceleration, the road gradient sine value, and the transmission ratio into a vehicle mass prediction model to obtain a predicted mass of the heavy vehicle.

Namely, by inputting the filtered speed, engine output torque, vehicle longitudinal acceleration, road gradient sine value, and transmission ratio under the driving condition into the vehicle mass prediction model, and solving the calculations within the model, the predicted mass of the heavy vehicle can be obtained.

It is understood that the input values into the vehicle mass prediction model, such as speed, engine output torque, vehicle longitudinal acceleration, road gradient sine value, and transmission ratio, are all sequences. For example, there are sequences for the speed, engine output torque, vehicle longitudinal acceleration, road gradient sine value, and transmission ratio. Each sampling point in the speed sequence corresponds to the speed value at that point, the engine output torque sequence corresponds to the engine output torque at the corresponding sampling point, the road gradient sine value sequence corresponds to the road gradient sine value at the corresponding sampling point, the vehicle longitudinal acceleration sequence corresponds to the vehicle longitudinal acceleration at the corresponding sampling point, and the transmission ratio sequence corresponds to the transmission ratio at the corresponding sampling point. These values are then input into the vehicle mass prediction model, resulting in an equation to be solved.

By repeating this process for another sampling point, where the speed, engine output torque, vehicle longitudinal acceleration, road gradient sine value, and transmission ratio are input into the vehicle mass prediction model, another equation to be solved is obtained. Through multiple equations to be solved, the final predicted mass can be obtained.

In one embodiment, the predicted mass of the heavy vehicle is obtained by the vehicle mass prediction model executing the following formula:

$$mx_1 + kx_2 = \frac{T_{tq}i_0i_g\eta}{r} - \left(\frac{I_w}{r^2} + \frac{I_f i_0^2 i_g^2 \eta}{r^2}\right)a_v$$

where, $$x_1 = g(0.0076 + 0.000056v) + g\sin\alpha + ga_v; x_2 = \frac{kv^2}{2};$$

m represents a vehicle mass; g is the acceleration of gravity; v is a speed; sin α is the road gradient sine value; $a_v$ is the vehicle longitudinal acceleration; k is a variable coefficient of air resistance; $T_{tq}$ is the engine output torque; $i_0$ is the transmission ratio; $i_g$ is a primary reducer ratio; η overall drivetrain efficiency; r is a rolling radius of a tire; $I_w$ is a rotational inertia of a wheel, and $I_f$ is the rotational inertia of a flywheel.

Among the parameters, $I_w$, r, $I_f$, $i_0$, $i_g$, η and the like are design parameters of the vehicle, which can be provided by the vehicle manufacturer.

Among the parameters, g sin α is a road gradient acceleration; ay is the vehicle longitudinal acceleration; g(0.0076+0.000056v) is the vehicle rolling acceleration. Apparently, $x_1$ represents the comprehensive resistance acceleration.

Specifically, the recursive least squares method can be used to calculate the estimated mass. The real-time vehicle mass prediction model is based on the longitudinal dynamic equation of the vehicle, where the sum of rolling acceleration, longitudinal acceleration, and road gradient acceleration is used as a real-time input parameter for calculations, and the square of the vehicle speed is used as another real-time input parameter. The vehicle mass and the comprehensive coefficient of vehicle aerodynamic resistance are considered as variable parameters. The recursive least squares method is employed to estimate the vehicle mass in real-time.

In one embodiment, executing a machine learning parameter optimization algorithm may include steps S1-S7 as follows.

S1, setting up initial values for the plurality of filtering parameter.

S2, obtaining operating data of the heavy vehicle at different loadings; the operating data comprises the speed, engine output torque, satellite elevation, gear position, brake signal, and clutch signal.

S3, extracting the speed, engine output torque, satellite elevation, and gear position under the driving condition from the operating data based on the brake signal and clutch signal.

S4, determining the transmission ratio of the heavy vehicle based on the gear position under the driving condition.

S5, filtering the speed, the engine torque, and the satellite elevation under the driving condition using the three of the plurality of filtering parameters; determining the vehicle longitudinal acceleration under the driving condition using the filtered speed and the one of the plurality of filtering parameters; determining the road gradient sine value under the driving condition using the filtered speed, satellite elevation, and the one of the plurality of filtering parameters; using the filtered speed, engine output torque, longitudinal acceleration, road gradient sine value, and transmission ratio as training data; and labeling the training data with the corresponding vehicle mass based on the loadings.

S6, inputting the speed, engine output torque, longitudinal acceleration, road gradient sine value, and transmission ratio from the training data into the vehicle mass prediction model to obtain the predicted mass for the heavy vehicle.

S7, comparing the predicted mass with the labeled vehicle mass to determine if it meets optimization goals of the machine learning parameter optimization algorithm.

if yes, outputting current values of the plurality of filtering parameters, and terminating iteration.

if no, adjusting each of the plurality of filtering parameters, and returning to step S5.

Apparently, the process of executing machine learning parameter optimization algorithm to obtain the plurality of filtering parameters is similar to the process of the method for predicting mass of vehicles. The process of executing the machine learning parameter optimization algorithm is actually a training process, through which the plurality of filtering parameters are obtained. On the other hand, the method for predicting mass of vehicles is an application process where the plurality of trained filtering parameters are utilized for filtering processing.

The machine learning parameter optimization algorithm includes, but is not limited to, Bayesian optimization, genetic algorithms, and grid search. For example, Bayesian optimization algorithm can be used for optimizing the configuration of filtering parameters. The ranges of the filtering parameters during the search process using the Bayesian optimization algorithm are specified in the following Table 1:

TABLE 1

| Filtering parameters | Search ranges of Bayesian optimization algorithm |
| --- | --- |
| w1 | [0.05, 0.5] |
| w2 | [0.05, 0.5] |
| w3 | [10, 100] |
| w4 | [0.05, 0.5] |
| w5 | [0.05, 0.5] |

In one embodiment an objective function of the machine learning parameter optimization algorithm is:

$$f(x) = \frac{1}{n}\sum_{i=1}^{n} -|y_i - y_{pred}|$$

where, $y_i$ represents the labeled vehicle mass for the i-th training data during one iteration; $y_{pred}$ represents the predicted mass outputted by the vehicle mass prediction model for the i-th training data during one iteration; n represents the number of training data in one iteration; x represents current values of the plurality of filtering parameters; and $f(x)$ represents the objective function; the optimization goal of the objective function is to maximize the function value of the objective function.

For example, by utilizing the iterative process of Bayesian optimization algorithm, the combination of filtering parameters that corresponds to the maximum value of the objective function is selected as the optimal solution.

The disclosed method in this embodiment is based on vehicle longitudinal dynamics, recursive least squares, and digital filtering algorithms to achieve the prediction of the mass of heavy vehicles. Under the existing configuration of heavy vehicles, it can accurately obtain real-time vehicle mass, addressing the issues of high cost and low accuracy in mass prediction of heavy vehicles.

Figure 2:
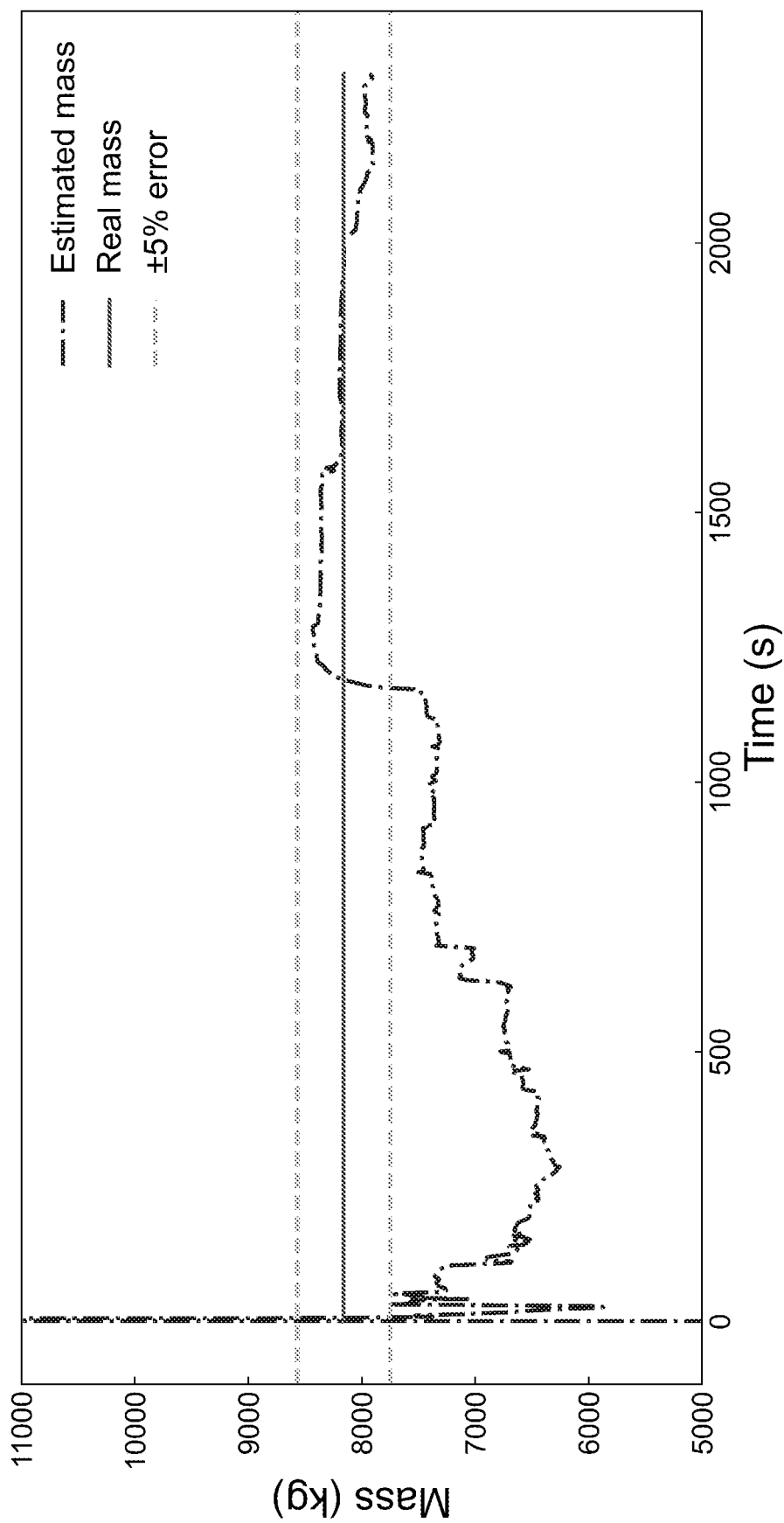
FIG. 2 is a schematic diagram showing the prediction results of the vehicle mass prediction model according to one embodiment of the present disclosure.

Please refer to FIG. 2, which illustrates the predicted results of the vehicle mass prediction model on a new dataset. In FIG. 2, the horizontal axis represents the amount of training data, while the vertical axis represents the vehicle mass. The solid line on the graph represents the real mass of the vehicle, and the dashed curve represents the estimated mass outputted by the vehicle mass prediction model. It can be observed that as the vehicle mass prediction model is continuously trained, its predictive ability improves, resulting in a closer approximation between the estimated mass and real mass. By adopting the vehicle mass prediction model described in this embodiment of the present disclosure, real-time prediction of vehicle mass can be achieved without the need for additional sensors or devices. The prediction error is no higher than 6%, and with an increase in the amount of training data, the prediction error can be further reduced. This demonstrates the innovation and potential application of the proposed approach.

The various embodiments described in this specification are presented in a progressive manner. Similar or identical aspects between different embodiments can be cross-referenced, while the focus of each embodiment is on the differences from others. In particular, for device embodiments, as they are fundamentally similar to method embodiments, the description is relatively concise. Relevant information can be referred to in the corresponding sections of the method embodiments.

One with ordinary skill in the art should be aware that in the aforementioned one or more examples, the functionality described in this disclosure can be implemented using hardware, software, peripherals, or any combination thereof. When implemented through software, these functionalities can be stored in computer-readable media or transmitted as one or multiple instructions or code on computer-readable media.

It should be noted that the terms used in the present disclosure are used to describe specific embodiments and do not limit the scope of the claims. As shown in this specification, unless otherwise explicitly indicated by the context, terms such as "one," "a," "an," and/or "the" are not specifically limited to singular form and may include plural forms. The terms "comprise," "include," or any other variations thereof, are intended to cover non-exclusive inclusion, such that a process, method, or device that includes a series of elements encompasses not only those elements explicitly listed but also additional elements not explicitly listed or inherent to such process, method, or device. In the absence of further limitations, the use of the phrase "comprising a . . ." to describe an element does not exclude the presence of other identical elements in a process, method, or device that includes the described element.

Furthermore, it should be clarified that terms such as "center," "upper," "lower," "left," "right," "vertical," "horizontal," "inside," "outside," and similar directional or locational relationships are based on the orientations or locations shown in the drawings for the purpose of describing the present disclosure and simplifying the description. They do not indicate or imply that the devices or components referred to must have specific orientations, be constructed or operated in specific orientations. Therefore, they should not be understood as limitations to the present disclosure. Unless otherwise specified and limited, terms such as "mount," "connect," "attach," and the like should be broadly interpreted. For example, they can refer to fixed connections, detachable connections, or integral connections; mechanical connections or electrical connections; direct connections or indirect connections through intermediate media; or connections within two components. Those skilled in the art can understand the specific meanings of these terms in the context of the present disclosure.

Finally, it should be noted that the above embodiments are provided for the purpose of illustrating the technical solutions of the present disclosure and are not intended to limit the scope thereof. Although detailed descriptions have been provided with reference to the aforementioned embodiments, those skilled in the art should understand that modifications can be made to the technical solutions described in the aforementioned embodiments, or equivalent replacements can be made to some or all of the technical features. Such modifications or replacements do not depart from the essence of the technical solutions of the various embodiments of the present disclosure.

What is claimed is:

1. A method for predicting mass of heavy vehicles based on networked operating data and machine learning, comprising:

collecting operating data of a heavy vehicle within a preset period through a vehicle-mounted data terminal; wherein the operating data comprises speed, engine output torque, satellite elevation, gear position, brake signal, and clutch signal of the heavy vehicle;

extracting the speed, engine output torque, satellite elevation, and gear position under a driving condition from the operating data according to the braking signal and the clutch signal;

determining a transmission ratio of the heavy vehicle according to the gear position under the driving condition;

obtaining a plurality of filter parameters generated by executing a machine learning parameter optimization algorithm in advance; filtering the speed, engine output torque, and satellite elevation under the driving condition using three of the plurality of filter parameters; determining a vehicle longitudinal acceleration under the driving condition using the filtered speed and one of the plurality of filter parameters; determining a road gradient sine value under the driving condition using the filtered speed, the filtered satellite elevation, and one of the plurality of filter parameters; and inputting the filtered speed, the vehicle longitudinal acceleration, the road gradient sine value, and the transmission ratio into a vehicle mass prediction model to obtain a predicted mass of the heavy vehicle;

wherein the predicted mass of the heavy vehicle is obtained by the vehicle mass prediction model executing the following formula:

$$mx_1 + kx_2 = \frac{T_{tq}i_0 i_g \eta}{r} - \left(\frac{I_w}{r^2} + \frac{I_f i_0^2 i_g^2 \eta}{r^2}\right) a_v$$

where, $$x_1 = g(0.0076 + 0.000056v) + g\sin\alpha + ga_v; x_2 = \frac{kv^2}{2};$$

m represents a vehicle mass; g is the acceleration of gravity; v is a speed; sin α is the road gradient sine value; $a_v$ is the vehicle longitudinal acceleration; k is a variable coefficient of air resistance; $T_{tq}$ is the engine output torque; $i_0$ is the transmission ratio; $i_g$ is a primary reducer ratio; η overall drivetrain efficiency; r is a rolling radius of a tire; $I_w$ is a rotational inertia of a wheel, and $I_f$ is the rotational inertia of a flywheel;

wherein filtering the speed, engine output torque, and satellite elevation under the driving condition using three of the plurality of filter parameters comprises:

filtering the speed under the driving condition using a Butterworth low-pass filter, wherein a normalization parameter of a cutoff frequency parameter of the Butterworth low-pass filter is w1, and an order of a polynomial is 2;

filtering the engine output torque under the driving condition using the Butterworth low-pass filter, wherein the normalization parameter of the cutoff frequency of the Butterworth low-pass filter is w2, and the order of the polynomial is 2;

extracting a 75th percentile value Q3 and a 25th percentile value Q1 from a first data sequence corresponding to the satellite elevation under the driving condition; determining a first filtering range as [Q1−1.5(Q3−Q1), Q3+1.5(Q3−Q1)], and removing the satellite elevation that outsides the first filtering range from the first data sequence; and filtering the satellite elevation within the first filtering range under the driving condition using a S-G filter (Savitzky-Golay filter), wherein a window length of the S-G filter is w3, and the order of the polynomial is 3;

wherein the normalization parameter w1, the normalization parameter w2, and the windows length w3 are the three of the plurality of the filter parameters.

2. The method according to claim 1, wherein extracting the speed, engine output torque, satellite elevation, and gear position under a driving condition from the operating data according to the braking signal and the clutch signal comprises:

extracting the speed, the engine output torque, the satellite elevation, and gear position, corresponding to a condition where both the brake signal and the clutch signal are 0, from the operating data.

3. The method according to claim 1, wherein determining a vehicle longitudinal acceleration under the driving condition using the filtered speed and one of the plurality of filter parameters comprises:

calculating the vehicle longitudinal acceleration under the driving condition according to the filtered speed;

extracting a 75th percentile value Q3 and a 25th percentile value Q1 from a second data sequence corresponding to the vehicle longitudinal acceleration under the driving condition; determining a second filtering range as [Q1−1.5(Q3−Q1), Q3+1.5(Q3−Q1)] according to the 75th percentile value Q3 and the 25th percentile value Q1, and removing the vehicle longitudinal acceleration that outsides the second filtering range from the second data sequence; and filtering the vehicle longitudinal acceleration within the second filtering range under the driving condition using the S-G filter to obtain a filtered vehicle longitudinal acceleration under the driving condition; wherein a normalization parameter of a cutoff frequency parameter of the Butterworth low-pass filter is w4, and the order of the polynomial is 2; the normalization parameter w4 is the one of the plurality of filter parameters.

4. The method according to claim 3, wherein calculating the vehicle longitudinal acceleration under the driving condition according to the filtered speed comprises:

calculating the vehicle longitudinal acceleration under the driving condition by a formula $$a_v = \frac{dv}{dt};$$

where, dv represents a speed difference between adjacent sampling points; dt represents a time difference between adjacent sampling points; $a_v$ represents the vehicle longitudinal acceleration.

5. The method according to claim 1, wherein determining a road gradient sine value under the driving condition using the filtered speed, the filtered satellite elevation, and one of the plurality of filter parameters comprises:

calculating the road gradient sine value under the driving conditions based on the filtered satellite elevation and the filtered speed;

extracting a 75th percentile value Q3 and a 25th percentile value Q1 from a third data sequence corresponding to the road gradient sine value under the driving condition; determining a third filtering range as [Q1−1.5(Q3−Q1), Q3+1.5(Q3−Q1)] according to the 75th percentile value Q3 and the 25th percentile value Q1, and removing the road gradient sine value that outsides the third filtering range from the third data sequence; and filtering the road gradient sine value within the third filtering range under the driving condition using the Butterworth low-pass filter to obtain a filtered road gradient sine value under the driving condition; wherein a normalization parameter of a cutoff frequency parameter of the Butterworth low-pass filter is w5, and the order of the polynomial is 2; the normalization parameter w5 is the one of the plurality of filter parameters; and removing the road gradient sine values that are greater than 0.08 or less than −0.08.

6. The method according to claim 5, wherein calculating the road gradient sine value under the driving conditions based on the filtered satellite elevation and the filtered speed comprises:

calculating the road gradient sine value under the driving condition by a formula $$\sin\alpha = \frac{dh}{0.5 \times dv \times dt};$$

where, sin α is the road gradient sine value; dh represents a satellite elevation difference between adjacent sampling points; dv represents the speed difference between adjacent sampling points; dt represents the time difference between adjacent sampling points.

7. The method according to claim 1, wherein executing a machine learning parameter optimization algorithm comprises:

S1, setting up initial values for the plurality of filtering parameter;

S2, obtaining operating data of the heavy vehicle at different loadings; the operating data comprises the speed, engine output torque, satellite elevation, gear position, brake signal, and clutch signal;

S3, extracting the speed, engine output torque, satellite elevation, and gear position under the driving condition from the operating data based on the brake signal and clutch signal;

S4, determining the transmission ratio of the heavy vehicle based on the gear position under the driving condition;

S5, filtering the speed, the engine torque, and the satellite elevation under the driving condition using the three of the plurality of filtering parameters; determining the vehicle longitudinal acceleration under the driving condition using the filtered speed and the one of the plurality of filtering parameters; determining the road gradient sine value under the driving condition using the filtered speed, satellite elevation, and the one of the plurality of filtering parameters; using the filtered speed, engine output torque, longitudinal acceleration, road gradient sine value, and transmission ratio as training data; and labeling the training data with the corresponding vehicle mass based on the loadings;

S6, inputting the speed, engine output torque, longitudinal acceleration, road gradient sine value, and transmission ratio from the training data into the vehicle mass prediction model to obtain the predicted mass for the heavy vehicle;

S7, comparing the predicted mass with the labeled vehicle mass to determine if it meets optimization goals of the machine learning parameter optimization algorithm;

if yes, outputting current values of the plurality of filtering parameters, and terminating iteration;

if no, adjusting each of the plurality of filtering parameters, and returning to step S5.

8. The method according to claim 7, wherein an objective function of the machine learning parameter optimization algorithm is:

$$f(x) = \frac{1}{n}\sum_{i=1}^{n} -|y_i - y_{pred}|$$

where, $y_i$ represents the labeled vehicle mass for the i-th training data during one iteration; $y_{pred}$ represents the predicted mass outputted by the vehicle mass prediction model for the i-th training data during one iteration; n represents the number of training data in one iteration; x represents current values of the plurality of filtering parameters; and $f(x)$ represents the objective function; the optimization goal of the objective function is to maximize the function value of the objective function.

* * * * *